July 4, 1939.  C. L. BEAL  2,165,089
MANUFACTURE OF RUBBER THREAD
Filed Aug. 15, 1936   2 Sheets-Sheet 1
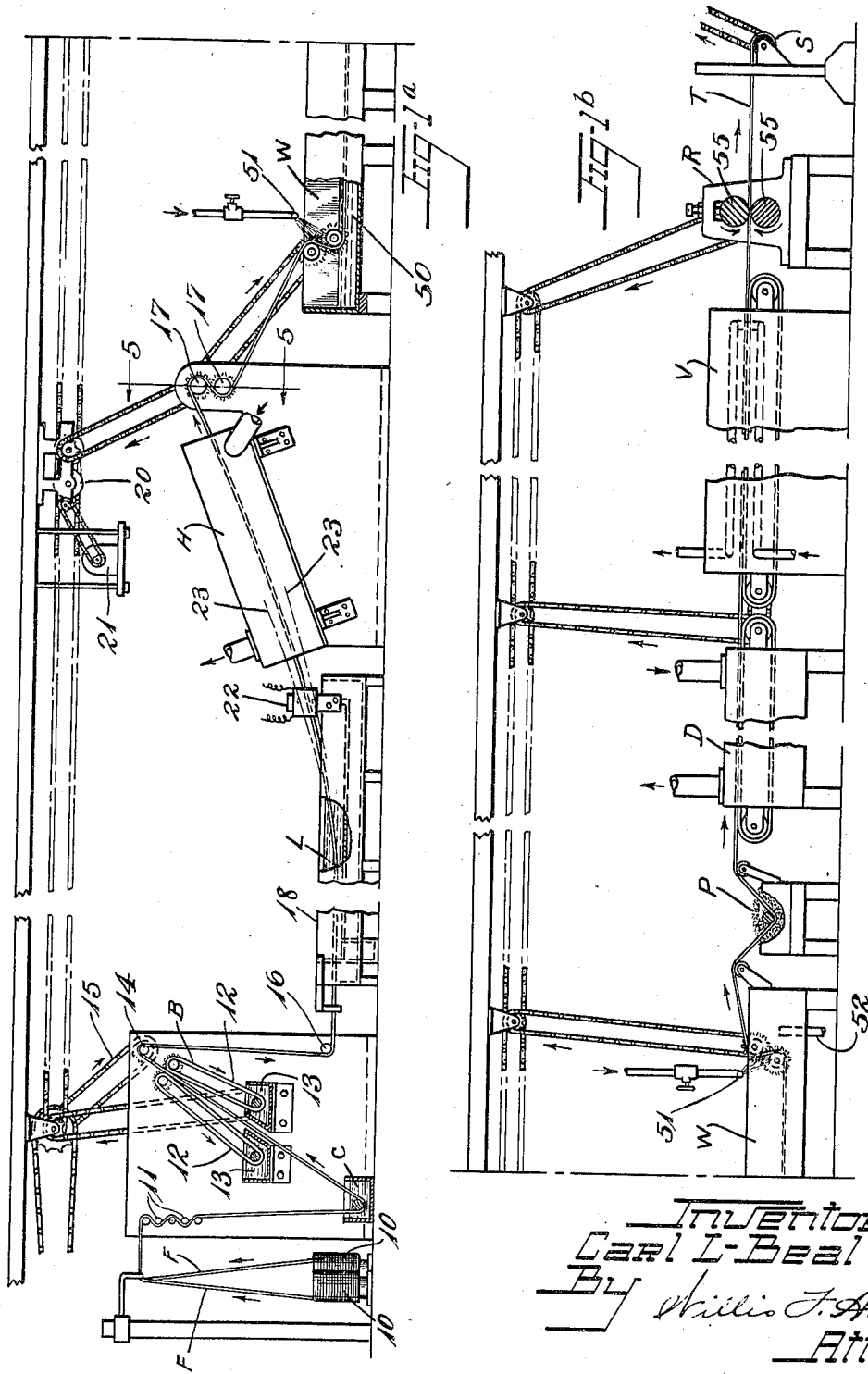
Inventor
Carl L. Beal
By Willis F. Avery
Atty.

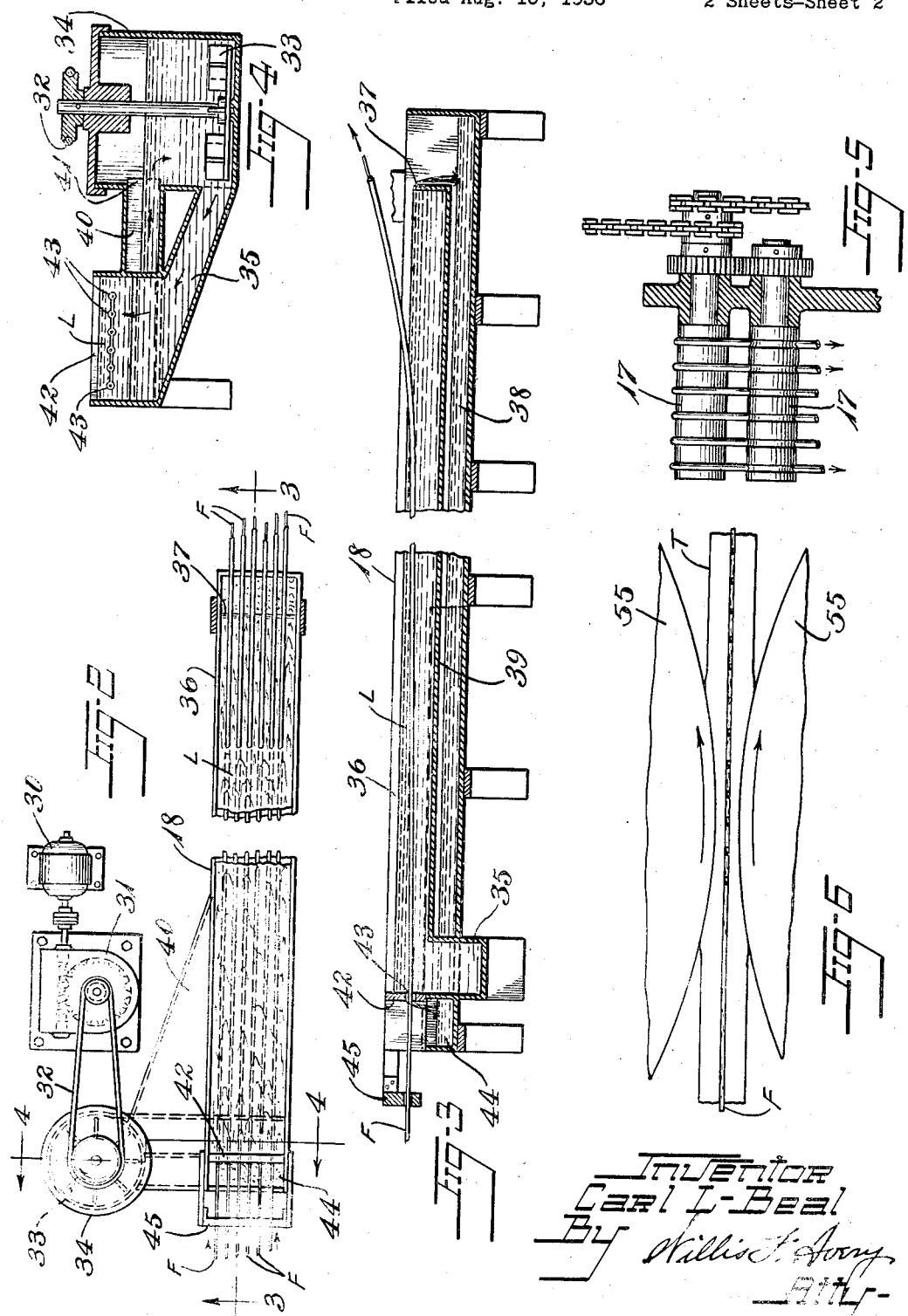

Patented July 4, 1939

2,165,089

UNITED STATES PATENT OFFICE 2,165,089

MANUFACTURE OF RUBBER THREAD

Carl L. Beal, Cuyahoga Falls, Ohio, assignor to American Anode Inc., Akron, Ohio, a corporation of Delaware Application August 15, 1936, Serial No. 96,201

14 Claims. (Cl. 18—8)

This invention relates to the manufacture of elastic rubber thread especially adapted for use in conjunction with textile materials for making stretchable garments and similar articles, and for other purposes where such threads are now used. More particularly, the invention is directed to improvements on the method described and claimed, inter alia, in the U. S. Patent No. 2,030,208 granted February 11, 1936, to Marion M. Harrison, in which a fibrous filament of relatively low extensibility is provided with a coating of highly extensible material such as latex rubber and thereafter is disintegrated to produce a freely extensible tubular rubber thread containing the disintegrated fibrous residue.

The general objects of the present invention are to provide efficient and economical procedure and apparatus for manufacturing rubber thread of highly uniform size and quality; to provide for coagulating a uniform coating of latex rubber upon a traveling filament, and to provide for drying the coating upon the filament without subjecting it to deforming pressures; to provide efficient procedure and apparatus for mechanically disintegrating the fibrous filament and for chemically assisting the disintegration; to provide coordinated apparatus for efficiently manufacturing rubber thread in a continuous fashion with minimum variation in size and quality of the thread; and to provide apparatus especially adapted for operation under commercial manufacturing conditions requiring certainty of continuous operation with a minimum of attention. The manner in which these and other objects of the invention are attained may readily be understood from the following detailed description of a preferred embodiment of the invention as illustrated in the accompanying drawings, of which Figs. 1a and 1b constitute a diagrammatic side elevation, partially sectioned for clarity of illustration, showing a preferred form of apparatus for manufacturing rubber thread according to the present invention;

Fig. 2 is a plan view of a portion of the apparatus of Fig. 1a, illustrating more in detail features of that portion of the apparatus in which latex rubber is deposited upon the traveling filament;

Fig. 3 is a vertical section taken on line 3—3 of Fig. 2;

Fig. 4 is a vertical section taken on line 4—4 of Fig. 2;

Fig. 5 is a vertical section taken on line 5—5 of Fig. 1a;

Fig. 6 is a diagram illustrating the probable mechanics of the filament breaking operation.

Considering first the general aspects of the preferred embodiment of the invention illustrated in the drawings, a plurality of fibrous filaments F are directed in parallel spaced apart relation over successive guides, rollers, and conveyors in such manner as to cause the filaments to pass through a bath of coagulant C for liquid latex, then between the traveling belts of a wiping device B, then through a body of liquid rubber latex L, to receive a concentric coating of coagulated latex rubber, and thereafter in succession through a heater H, a washer W, a device P for applying adhesion-preventing powder, a dryer D, a vulcanizer V, then through a roller device R for breaking the internal fibrous filaments to leave freely extensible tubular rubber threads T which finally are reeled upon spools S or disposed of in any other convenient manner.

The fibrous filaments F may be any well known type of twisted or untwisted cotton, silk, artificial silk, wool, or other fibrous thread, yarn or the like, or even filaments of non-fibrous materials, which are relatively inextensible as compared to rubber and have sufficient strength to withstand the tensional forces incident to the process and which at the same time may be disintegrated either mechanically or chemically without injuring the rubber coating constituting the tubular thread. For making the relatively small gauge threads of around .025 inch diameter now in greatest demand, however, I prefer to use a 30 to 50 denier viscose or cellulose acetate yarn, both of which have been found to be quite satisfactory. In the preferred process, the artificial silk filaments F are unwound from the supply spools 10, 10, and directed through a tensioning comb 11 designed, by frictional drag, to hold the filaments taut against pull of the apparatus.

The coagulant C, into which the filaments are next directed, may be any composition having a coagulating or agglomerating effect upon liquid rubber latex, but preferably is a liquid composition containing a polyvalent metal salt dissolved in a volatile organic solvent containing a minor proportion of a wetting agent, such as any of the coagulant compositions described in the U. S. Patent No. 1,996,090 granted April 2, 1935, to Edward A. Willson. For use in conjunction with a viscose yarn, a coagulant solution containing 500 grams of commercial calcium nitrate dissolved in 1000 c. c. of acetone containing 30 c. c of lactic acid is quite satisfactory. In some cases, to facilitate breaking of the fibrous filament, I may add to the coagulant composition, or otherwise treat the filament with a chemical adapted to weaken or even completely to disintegrate its fibrous structure. Thus when using a soluble artificial silk filament, I may add to the coagulant composition a solvent or other material which will slowly attack and weaken, or even eventually completely dissolve the filament. For example, if a soluble cellulose ester filament is used, I may add to the coagulant composition from 5 to 75 c. c. per liter of a solvent such as ethyl acetate, methyl acetoacetate, ethyl acetoacetate, 2-ethyl-butyl acetate, isopropyl acetate, or the like, which will slowly dissolve the cellulose acetate filament. The solvents have been mentioned roughly in the order of decreasing activity and the quantity used will vary according to the activity of the solvent to provide a composition which will effect the requisite weakening without destroying the filament before production of the thread is completed. As a typical example suitable for use in conjunction with a 30 to 50 denier cellulose acetate yarn, I may use a composition containing 500 grams of commercial calcium nitrate dissolved in 1000 c. c. of alcohol containing 30 c. c. of lactic acid and 10 c. c. of ethyl acetate. By increasing the quantity of ester solvent used substantially above the proportions given, it is possible entirely to dissolve the cellulose ester filament and thus completely to dispense with any mechanical breaking operation, but when this condition is attained, the filament may be weakened so rapidly that it will break before production of the thread is completed which is undesirable for production operations in which uniformity of extensibility of the plurality of coated filaments is highly desirable. For this reason I ordinarily use only such quantities of ester solvents as will substantially weaken without completely destroying the filaments.

For producing a uniform deposit of latex rubber, it is highly important that the coagulant coating or impregnation of the filament be quite uniform and, especially, free of droplets or similar localized concentrations of coagulant. Ordinary static wiping devices are unsuitable because they in time become so coated or filled with the coagulant composition as to destroy their effectiveness, and I have therefore found it desirable for continuous operations to provide a novel kinetic belt wiper B consisting of a pair of diverging endless rubber or similar belts 12, 12 arranged in opposed relation embracing between them the filaments freshly treated with coagulant, with the upper ends of the belts just contacting without substantially squeezing the treated filaments and with the lower diverging ends of the belts respectively immersed in baths of cleaning solution 13, 13 which may be the same solvent as that used as the vehicle in the coagulant composition. The wiping belts are positively driven, as indicated in the drawing, with the wiping surfaces traveling in the same direction as the filaments, but preferably at a substantially different and desirably slower speed of for example a speed of one-twelfth foot per minute for a typical filament speed of six feet per minute. The continuously cleaned wiping belts effectively remove localized concentrations of coagulant from the filament or distribute them more evenly and insure consistently uniform coagulant coatings over long periods of operations.

After the wiping operation, the coagulant-treated filaments are passed over a grooved guide roller 14 having a frictional gripping surface and being positively driven as by the sprocket chain 15 at a convenient speed advancing the filaments at a suitable rate of for example the indicated six feet per minute. The filaments then pass under a grooved idler roller 16 and then in a relatively long catenary-like sweep upward to the positively driven rollers 17, 17 disposed at a level higher than the roller 16, and about which the filaments are directed with reversals in direction as shown to eliminate slippage and insure positive advance of the filaments at a uniform speed.

The lower and more nearly horizontal portion of the catenary sweep of the filament is surrounded by a body of liquid rubber latex L, contained in a deposition tank generally designated 18, in such manner that the filaments enter the latex horizontally below the liquid level and emerge angularly through the surface of the latex as more clearly shown in Fig. 3, while the upper portion of the catenary sweep is surrounded by a hot air heater H. It is immediately apparent that this arrangement provides for passing the coagulant-treated filament through the body of latex to receive a coating of deposited latex rubber coagulum, and for drying the coagulum at least partially to a less deformable condition, all without any deforming pressure contacts whenever, thereby insuring the production of highly uniform, undistorted, and undeformed rubber deposits with a resulting improvement in quality of the product.

For further insuring uniformity by compensating for operating variables and especially for maintaining the desired catenary sweep and thereby insuring proper entry of the filaments into and emergence from the latex, provision is made for varying the speed of the rollers 17, 17, and other following devices with respect to the speed of the roller 14, as required to maintain a proper operating relationship. The apparatus effecting this control includes the variable speed device 20 linking the drives of the two portions of the apparatus, which device is capable of variation effected by the motor 21 controlled by the "electric eye" device 22 in such manner as to increase or decrease the speed of the rollers 17, 17 as the coated filament falls below or rises above predetermined limiting lines of travel indicated by the broken lines designated 23, 23.

The deposition tank, generally designated 18, and associated latex circulating equipment embody novel features of construction and operation especially useful in the present invention but also useful in latex processes other than the particular thread manufacturing procedure herein described and including processes for coating any kind of traveling thread, wire, strip or band, all of which are contemplated in using the broad term "filament", with a permanent or removable coating of latex rubber for any desired purpose. This portion of the apparatus includes a motor 30 driving, through a worm gear reduction drive 31 and the belt 32, a centrifugal impeller 33, which rotates at a speed of for example about 70 R. P. M. adjacent the bottom of the cylindrical impeller sump 34 and forces the liquid latex L centrifugally outward and up the ramp 35 through a suitable opening into one end of the preferably relatively long rectangular main deposition tank 36. The latex flows lengthwise of the tank and spills over the header 37 into a return chamber 38 underneath the main deposition tank and formed by the false bottom 39 extending almost the entire length of the deposition apparatus but terminating at the header 37. The latex flows back the length of the return chamber which is extended angularly as indicated at 40 to open into the impeller sump at 41 above the level of the centrifugal impeller, thereby to return the latex to the impeller sump for recirculation. The end of the tank 36 adjacent the impeller is formed by a removable header 42 provided with a series of aligned apertures 43 at a position below the normal level of the latex as determined by the height of the spillway header 37, the apertures being connected by horizontal slots for ease in threading the filaments. A minor proportion of the latex streams outward through these apertures and spills into the low-level return sump 44 which opens into the widened extension 40 of the main return chamber and so returns to the impeller sump.

As the filaments F, guided by the extending apertured and slotted guide 45, enter the body of latex through the streams issuing from the apertures 43 and travel through the latex to emerge from the surface as described, it is seen that a steady flow of the main body of latex is maintained in the direction of travel of the filaments which tends to minimize disturbance of the latex especially at the point of emergence of the filaments as well as to prevent skimming over of the surface of the latex, all of which contributes to the production of uniform high quality rubber deposits upon the traveling filaments.

The heating of the fresh rubber deposit effected in the heater H should be at least sufficient firmly to set the surface to a relatively non-deformable state, but may be continued further if desired. It is usually preferred, however, not to dry the deposit completely before the washing operation, and a drying period at this stage of one to two minutes at a fairly high temperature around 200° F. is satisfactory for ordinary commercial production operations.

The washer W should be of sufficient length with respect to the rate of travel of the coated filaments to provide a washing period of from ten to fifteen minutes in a bath of water 50 at a temperature preferably about 150° F. which is continuously replenshed by hot water sprayed upon the coated filaments as they enter and as they leave the washer as by the sprays 51, 51 and maintained at a level above the line of travel of the filaments by a drain pipe 52 of suitable height.

The adhesion preventing powder applied to the wet rubber deposit at P may be soapstone, magnesium carbonate, starch, or other dusting material ordinarily used for such purposes, either in powder form, or suspended in a liquid vehicle.

The dryer D may be heated by circulating hot air at a temperature of about 160° F. and should be of sufficient length to provide a drying period of from one to one and a half hours, or equivalent drying, sufficient substantially completely to dry the deposit. The vulcanizer P, for ordinary rubber compositions will usually be heated as by steam coils to a higher temperature, a typical operating condition being a vulcanizing treatment of 30 minutes at 220° F. for a rubber deposit formed from a latex composition containing 100 parts of rubber added as the centrifugally concentrated latex of commerce, 3.0 parts of sulfur, 0.6 parts of an organic accelerator such as mercapto benzothiazole, 2.0 parts of zinc oxide, 6.0 parts of a white pigment such as titanium dioxide, 0.1 part of an organic dye, and 0.3 part of an age-resister, and containing the usual quantities of protective colloids and stabilizing agents added with the colloidally dispersed compounding materials.

For breaking the fibrous filaments within the rubber coatings, a pair of rotatably mounted steel squeeze rolls 55, 55 spaced apart a distance substantially less than the overall diameter of the coated filaments, for example from a fourth to a half the diameter, and being positively driven at a surface speed substantially the same as the rate of travel of the coated filaments so there is no substantial stretching of the freely suspended portions of the coated filaments, have been found to be very efficient for breaking the filaments into small fragments of uniform lengths, and to be well adapted for continuous commercial operations. While there may be some difference of opinion concerning the mechanics of the filament breaking operation, a seemingly plausible explanation is that each filament and associated resilient rubber coating is advanced substantially as a unitary structure and deformed longitudinally as well as transversely by the localized progressive squeezing effected by the rolls with the result that, somewhat analogous to the flow of fluid through a Venturi tube (Fig. 6), the portion of the structure passing through the zone of maximum deformation or constriction is advanced at a greater velocity, or in other words is accelerated, with respect to the less deformed portions of the structure so that the structure in passing between the squeeze rolls is subjected, in a highly localized zone, to a continuous progressive stretching exceeding the elastic limit of the filament and accordingly progressively breaking it into small fragments while leaving the freely extensible and resilient rubber coating uninjured. It has been observed that breaking rolls of relatively small diameter of around one half inch appear to effect a somewhat more uniform disintegration of the filaments into shorter fragments than do larger rolls of around four inches in diameter although the difference was not great and it is believed that wide variations in roll sizes may be made without seriously affecting the character of the breaking.

Rubber threads of a wide range of sizes made according to the invention herein described exhibit exceptional uniformity in size and related physical characteristics such as uniform stretch under tension and are of generally superior quality as shown by numerous comparative tests. The apparatus described may be operated continuously over long periods of time with a minimum of attention thereby effecting substantial economies.

The terms "latex" and "liquid rubber latex" have been used in the specification and claims in a broad sense to include not only natural rubber latex of the common Hevea variety, but all analogous aqueous dispersions of rubber, synthetic rubber, and similar materials whether in the unvulcanized, vulcanized, or reclaimed condition. Such dispersions may be concentrated, diluted, thickened, thinned, stabilized, destabilized, or otherwise preliminarily treated, and may contain any desirable compounding and conditioning agents.

While the invention has been described in considerable detail with reference to certain preferred procedures, apparatus, and materials, it is understood that such description is not to be considered limitative of the invention and that numerous modifications and variations may be made without departing from the spirit and scope of the invention as defined by the appended claims.

I claim:

1. The method of making an extensible rubber thread which comprises providing a tension-resisting cellulose ester filament of relatively low extensibility, causing the filament to travel in a continuous fashion and, in the course of such travel, associating with the filament a substantial quantity of a liquid composition containing a coagulant for liquid rubber latex and a slow solvent for the cellulose ester, transferring excess liquid from the filament to a traveling surface contacting therewith, passing the filament so treated in a catenary-like sweep through a body of coagulable liquid rubber latex to deposit thereon a coating of latex coagulum, subjecting the coagulum to finishing treatment for producing an extensible rubber coating, and thereafter breaking the solvent-weakened cellulose ester filament into fragments by continuous progressive stretching of the coated filament as it is advanced through a localized zone, whereby a tubular rubber thread containing the disintegrated filament residue is produced.

2. The method of making an extensible rubber thread which comprises providing a tension-resisting filament of relatively low extensibility, passing the filament in a catenary-like sweep through a body of liquid rubber latex without contacting any supporting or guiding means while in contact with the latex or immediately thereafter, to deposit a coating of rubber upon the filament, and thereafter substantially destroying the effectiveness of the filament as a tension-resisting element.

3. The method of treating a filament with liquid rubber latex which comprises providing a body of latex and causing the filament to travel in a continuous path passing substantially horizontally into the body of latex at a point below the surface of the latex and emerging angularly through the surface of the latex without contacting any supporting or guiding means while in contact with the latex or immediately thereafter.

4. The method of treating a filament with liquid rubber latex which comprises providing a body of latex, causing the filament to travel in a continuous path passing substantially horizontally into the body of latex and emerging angularly through the surface thereof, and maintaining a steady flow of the latex surface adjacent the point of emergence in the direction of travel of the filament.

5. The method of making an extensible thread which comprises providing a continuous filament of relatively low extensibility, coating the filament with a highly extensible resilient material, and breaking the filament into fragments solely by continuous progressive squeezing of the coated filament as it is advanced through a localized zone.

6. The method of making an extensible thread which comprises providing a continuous filament of relatively low extensibility, coating the filament with a highly extensible resilient material, and breaking the filament into fragments solely by subjecting the coated filament to progressive rolling pressure applied without substantially stretching uncompressed portions of the coated filament.

7. Apparatus for making an extensible rubber thread comprising, in combination, means for causing a filament to travel continuously along a pre-determined path including a catenary-like sweep, control means responsive to variations in the path of travel of the filament for maintaining the catenary-like sweep within determinate limits, means preceding the said sweep for applying liquid conditioning material to the filament, means including a traveling surface contacting the filament at a point preceding the said sweep for increasing the uniformity of distribution of the liquid conditioning material upon the filament, means adjacent the catenary-like sweep for applying liquid rubber latex to the filament to deposit thereon a coating of latex rubber, and means including a single pair of squeeze rolls for continuously stretching in a progressive manner portions of the coated filament advancing through a localized pressure zone, whereby the filament is broken into fragments leaving a freely extensible tubular rubber thread.

8. Apparatus of the character described comprising, in combination, means for causing a filament to travel continuously along a pre-determined path, means for applying a liquid conditioning material to the filament, wiping means for increasing the uniformity of distribution of the liquid material upon the filament said wiping means including a traveling surface disposed in wiping contact with the filament and means for driving the traveling surface at a speed differing substantially from the speed of the filament, and means for applying a coating of latex rubber to the filament.

9. Apparatus of the character described comprising, in combination, means for causing a filament to travel along a pre-determined path, means for applying a liquid conditioning material to the traveling filament, wiping means for increasing the uniformity of distribution of the liquid upon the filament, said wiping means comprising a pair of endless traveling belts so constructed and arranged as to effect wiping contact with opposed portions of the filament without substantially squeezing the filament, and means for applying a coating of latex rubber to the filament.

10. Apparatus of the character described comprising, in combination, means for causing a filament to travel continuously along a pre-determined catenary-like path including a substantially horizontal sweep at one end of the catenary, and means adjacent the horizontal sweep for applying a coating of latex rubber to the filament, the apparatus being so constructed and arranged as to effect passage of the filament through the zone in which the coating of latex rubber is applied without the filament contacting any supporting or guiding means within said zone.

11. Apparatus of the character described comprising, in combination, a tank having an aperture in a wall thereof and containing liquid coating material maintained at a level above the aperture, and means for causing a filament to travel in a path including a free catenary-like sweep passing substantially horizontally through the said aperture and emerging angularly from the surface of the liquid, the apparatus being so constructed and arranged as to effect passage of the filament through the coating material without the filament contacting any supporting or guiding means while in contact with the coating material.

12. Apparatus of the character described comprising, in combination, a tank having an aperture in a wall thereof and containing liquid coating material maintained at a level above the aperture, means for causing a filament to travel through the liquid in a catenary-like sweep entering through the said aperture and emerging angularly from the surface of the liquid, and means for maintaining flow of the coating liquid in the direction of travel of the filament.

13. Apparatus for making an extensible rubber thread comprising, in combination, means for applying a coating of highly extensible rubber to a fibrous filament of relatively low extensibility, means for advancing the filament and coating as a unitary structure at a substantially uniform rate, and means for disintegrating the filament as it is so advanced comprising a pair of squeeze rolls positively driven at a surface speed substantially equal to the rate of travel of the coated filament and adapted, by progressive deformation of the coating, to subject the unitary structure to progressive localized stretching exceeding the elastic limit of the filament.

14. Apparatus for making an extensible rubber thread comprising, in combination, means for applying an enveloping coating of highly extensible rubber to a fibrous filament of relatively low extensibility, and mechanical means for disintegrating the filament comprising a single pair of squeeze rolls adapted to advance the filament and its coating substantially as a unitary structure, and simultaneously with the advance, to deform the coating sufficiently to subject the filament to breaking tension within the zone of deformation.

CARL L. BEAL.

CERTIFICATE OF CORRECTION.

Patent No. 2,165,089.                                        July 4, 1939.

CARL L. BEAL.

It is hereby certified that error appears in the printed specification of the above numbered patent requiring correction as follows: Page 1, second column, line 9, for "liquid latex" read liquid rubber latex; page 2, second column, line 30, for "whenever" read whatever; page 3, first column, line 50, for "replenshed" read replenished; page 4, second column, line 25, claim 8, for "unformity" read uniformity; line 28, same claim, after "filament" insert a comma; and that the said Letters Patent should be read with this correction therein that the same may conform to the record of the case in the Patent Office.

Signed and sealed this 12th day of September, A. D. 1939.

(Seal)                                                Henry Van Arsdale,
                                                    Acting Commissioner of Patents.